US012387539B2

(12) United States Patent
Abraham et al.

(10) Patent No.: US 12,387,539 B2
(45) Date of Patent: Aug. 12, 2025

(54) ECU REPLACEMENT WITH ODOMETER

(71) Applicant: Ford Global Technologies, LLC, Dearborn, MI (US)

(72) Inventors: George Abraham, Macomb, MI (US); Shayne Baugher, Livonia, MI (US); Mandar Sadashiv Dalvi, Canton, MI (US); Michael Raymond Westra, Plymouth, MI (US); Robert Dekelbaum, Hanover, PA (US); Satya Meenakshi Raparthi, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 182 days.

(21) Appl. No.: 18/181,766

(22) Filed: Mar. 10, 2023

(65) Prior Publication Data

US 2024/0304044 A1 Sep. 12, 2024

(51) Int. Cl.
*G07C 5/08* (2006.01)
*G07C 5/00* (2006.01)

(52) U.S. Cl.
CPC .......... *G07C 5/0841* (2013.01); *G07C 5/008* (2013.01)

(58) Field of Classification Search
CPC ................................................ G07C 5/008
See application file for complete search history.

(56) References Cited

U.S. PATENT DOCUMENTS

| | | | | |
|---|---|---|---|---|
| 7,610,128 | B2 | 10/2009 | O'Connor et al. | |
| 10,042,359 | B1 * | 8/2018 | Konrardy | B60R 25/10 |
| 10,728,725 | B2 | 7/2020 | Hwang | |
| 11,544,173 | B1 * | 1/2023 | Gabrovski | G06F 11/3461 |

(Continued)

FOREIGN PATENT DOCUMENTS

| | | | |
|---|---|---|---|
| CN | 112277884 | A | 1/2021 |
| DE | 102021002085 | A1 | 6/2021 |
| IN | 201621022275 | | 1/2018 |

OTHER PUBLICATIONS

NPL, Car Creations, Everything you can do with the Carly App, https://www.youtube.com/watch?v=DTolmBr2Hhl, (Apr. 3, 2022) (hereinafter "Carly") (Year: 2022).*

(Continued)

*Primary Examiner* — Jean Paul Cass
(74) *Attorney, Agent, or Firm* — Christopher Storms; Brooks Kushman P.C.

(57) ABSTRACT

A computer includes a processor and a memory, and the memory stores instructions executable by the processor to receive a first data block from a server remote from the computer and remote from a vehicle; while the computer is installed on board the vehicle, receive a second data block from an electronic control unit (ECU) on the vehicle; compare the first data block and the second data block; upon identifying a match between the first data block and the second data block, replace a stored odometer value on the computer with a first odometer value; and upon identifying a mismatch between the first data block and the second data block, maintain the stored odometer value on the computer.

(Continued)

The first data block includes the first odometer value, and the second data block includes a second odometer value.

20 Claims, 8 Drawing Sheets

(56) References Cited

U.S. PATENT DOCUMENTS

2002/0091540 A1* 7/2002 Stumne .................. G06Q 30/04
705/34
2002/0184062 A1* 12/2002 Diaz ...................... G07C 5/008
701/29.3
2002/0190851 A1* 12/2002 Skibinski ............... B60K 35/21
340/439
2003/0171860 A1* 9/2003 Fan ....................... G01S 5/0027
340/439
2009/0139781 A1* 6/2009 Straubel .................. B60L 53/14
701/22
2011/0077816 A1* 3/2011 Biondo .................. G07C 5/008
701/31.4
2017/0228410 A1* 8/2017 Slusar ..................... G06F 21/00
2017/0316621 A1* 11/2017 Jefferies .................. B60R 25/01
2018/0178737 A1* 6/2018 Studnicka .......... G06Q 20/3224
2019/0279440 A1* 9/2019 Ricci ...................... G06Q 10/20
2019/0379683 A1* 12/2019 Overby ............... G06F 9/45533
2020/0167696 A1* 5/2020 Kuncl .................. G07C 5/0841
2020/0174780 A1* 6/2020 Gintz ........................ G06F 8/66
2020/0202645 A1* 6/2020 Gintz ................... G07C 5/0825
2020/0219335 A1* 7/2020 Gintz ................... G07C 5/0841
2021/0116256 A1* 4/2021 Konrardy ............. G06Q 50/265
2021/0209388 A1* 7/2021 Ciftci ..................... G06N 3/045
2022/0138700 A1* 5/2022 Oehler ................. G07C 5/0808
705/305
2022/0138810 A1* 5/2022 Oehler ................. G07C 5/0808
705/305
2023/0048622 A1* 2/2023 Hayward ......... G08G 1/096827
2023/0050853 A1* 2/2023 Klausner ............. G06F 21/6218
2023/0210442 A1* 7/2023 Krueger ............... A61B 5/6803
600/301
2023/0413733 A1* 12/2023 Harweger ............... A01F 25/16
2024/0310851 A1* 9/2024 Ebrahimi Afrouzi ... G01S 17/87
2024/0324838 A1* 10/2024 Ebrahimi Afrouzi ........................
G05D 1/2446

OTHER PUBLICATIONS

Carly, Detect Odometer Rollback Easily https://www.mycarly.com/blog/car-check/detect-odometer-rollback/ (Year: 2025).*

* cited by examiner

ECU REPLACEMENT WITH ODOMETER

BACKGROUND

An odometer is an instrument for measuring the distance traveled by a vehicle. The value of the odometer may be used as an estimate for the wear and tear of a vehicle, for example, when selling a used vehicle.

DETAILED DESCRIPTION

Figure 1A:
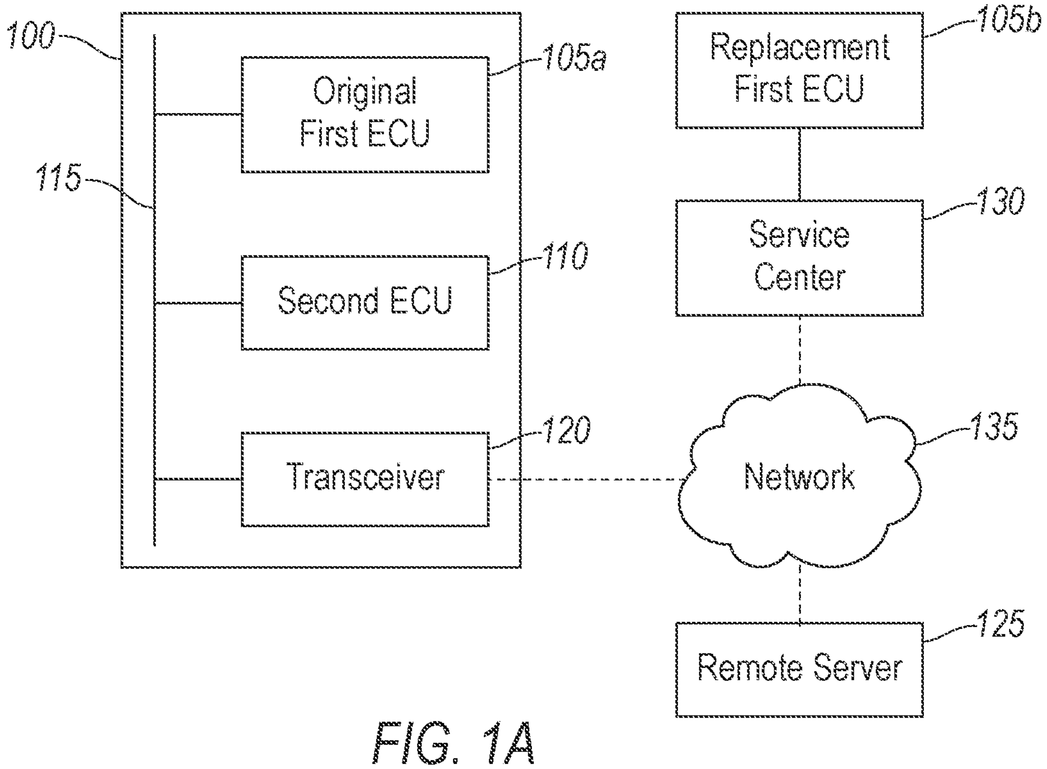
FIG. 1A is a block diagram of an example system for replacing an electronic control unit (ECU) including an odometer in a vehicle before replacement of the ECU.

This disclosure provides techniques for updating an odometer value in a secure manner that may prevent tampering, e.g., when installing an electronic control unit (ECU) containing the odometer value in a used vehicle. While on board a vehicle, an original first ECU may back up a third data block including a third odometer value on a second ECU on board the vehicle. During replacement, the original first ECU or the second ECU may send the third data block to the service center, which forwards the third data block to a remote server. A replacement first ECU may receive a first data block from the remote server, receive a second data block from the second ECU, and compare the first data block and the second data block. If both the first data block and the second data block were derived from the third data block, then the first data block and the second data block should have matching parts. Upon identifying a match between the first data block and the second data block, the replacement first ECU replaces a stored odometer value on the replacement first ECU with a first odometer value from the first data block. Upon identifying a mismatch between the first data block and the second data block, the replacement first ECU maintains the stored odometer value on the replacement first ECU. The replacement first ECU may thus detect attempted tampering with the comparison between the first data block from the remote server and the second data block backed up on board the vehicle. The replacement first ECU may thus take on an odometer value that is accurate to the vehicle, even if that odometer value is lower than the odometer value already on the replacement first ECU (e.g., if the replacement first ECU is used). The techniques herein facilitate replacement of an ECU that serves as the odometer of the vehicle.

A computer includes a processor and a memory, and the memory stores instructions executable by the processor to receive a first data block from a server remote from the computer and remote from a vehicle; while the computer is installed on board the vehicle, receive a second data block from an electronic control unit (ECU) on the vehicle; compare the first data block and the second data block; upon identifying a match between the first data block and the second data block, replace a stored odometer value on the computer with the first odometer value; and upon identifying a mismatch between the first data block and the second data block, maintain the stored odometer value on the computer. The first data block includes a first odometer value, and the second data block includes a second odometer value.

In an example, the instructions may further include instructions to increment the stored odometer value with distance traveled by the vehicle.

In an example, the instructions may further include instructions to transmit a third data block to the ECU, the third data block including the stored odometer value. In a further example, the instructions may further include instructions to periodically transmit the third data block to the ECU.

In another further example, the instructions may further include instructions to, upon the vehicle traveling a preset distance since a previous transmission of the third data block to the ECU, transmit the third data block to the ECU.

In another further example, the instructions may further include instructions to calculate a security feature and apply the security feature to the third data block before transmitting the third data block to the ECU.

In an example, the first odometer value may be less than the stored odometer value.

In an example, the match may be an equality between the first odometer value and the second odometer value, and the mismatch may be an inequality between the first odometer value and the second odometer value.

In an example, the first data block may include a first vehicle identification number (VIN), the second data block may include a second VIN, the match may be an equality between the first VIN and the second VIN, and the mismatch may be an inequality between the first VIN and the second VIN. In a further example, the instructions may further include instructions to, upon the first VIN not matching a third VIN of the vehicle, maintain the stored odometer value on the computer. In a yet further example, the instructions may further include instructions to determine the third VIN from a vehicle network of the vehicle.

In another further example, the instructions may further include instructions to, upon the second VIN not matching a third VIN of the vehicle, maintain the stored odometer value on the computer.

In an example, the instructions may further include instructions to, upon identifying the mismatch between the first data block and the second data block, instruct a component of the vehicle to disable an operation of the component.

In an example, the instructions may further include instructions to, upon identifying the mismatch between the first data block and the second data block, output a request for a fourth data block, the fourth data block previously downloaded from the vehicle, the fourth data block including a fourth odometer value. In a further example, the instructions may further include instructions to compare the first data block and the fourth data block; upon identifying a second match between the first data block and the fourth data block, replace the stored odometer value on the computer with the first odometer value; and upon identifying a second mismatch between the first data block and the fourth data block, maintain the stored odometer value on the computer. In a yet further example, the first data block may include a first security feature, the fourth data block may include a fourth security feature, the second match may be an equality between the first security feature and the fourth security feature, and the second mismatch may be an inequality between the first security feature and the fourth security feature. In a still yet further example, the first security feature may be calculated from the first odometer value, and the fourth security feature may be calculated from the fourth odometer value.

In another further example, the instructions may further include instructions to, upon failing to receive the fourth data block, maintain the stored odometer value on the computer.

In an example, the instructions may further include instructions to decrypt the first data block, and decrypt the second data block.

A method includes receiving a first data block from a server remote from a computer and remote from a vehicle; receiving a second data block from an electronic control unit (ECU) on the vehicle by the computer; comparing the first data block and the second data block; upon identifying a match between the first data block and the second data block, replacing a stored odometer value on the computer with the first odometer value; and upon identifying a mismatch between the first data block and the second data block, maintaining the stored odometer value on the computer. The first data block includes a first odometer value, and the second data block includes a second odometer value. The computer receives the second data block from the ECU while the computer is installed on board the vehicle.

With reference to the Figures, wherein like numerals indicate like parts throughout the several views, a first electronic control unit (ECU) 105 includes a processor and a memory, and the memory stores instructions executable by the processor to receive a first data block 250 from a remote server 125 remote from the first ECU 105 and remote from a vehicle 100; while the first ECU 105 is installed on board the vehicle 100, receive a second data block 225 from a second ECU 110 on the vehicle 100; compare the first data block 250 and the second data block 225; upon identifying a match between the first data block 250 and the second data block 225, replace a stored odometer value 205 on the first ECU 105 with a first odometer value 255; and upon identifying a mismatch between the first data block 250 and the second data block 225, maintain the stored odometer value 205 on the first ECU 105. The first data block 250 includes the first odometer value 255, and the second data block 225 includes a second odometer value 230.

Figure 1B:
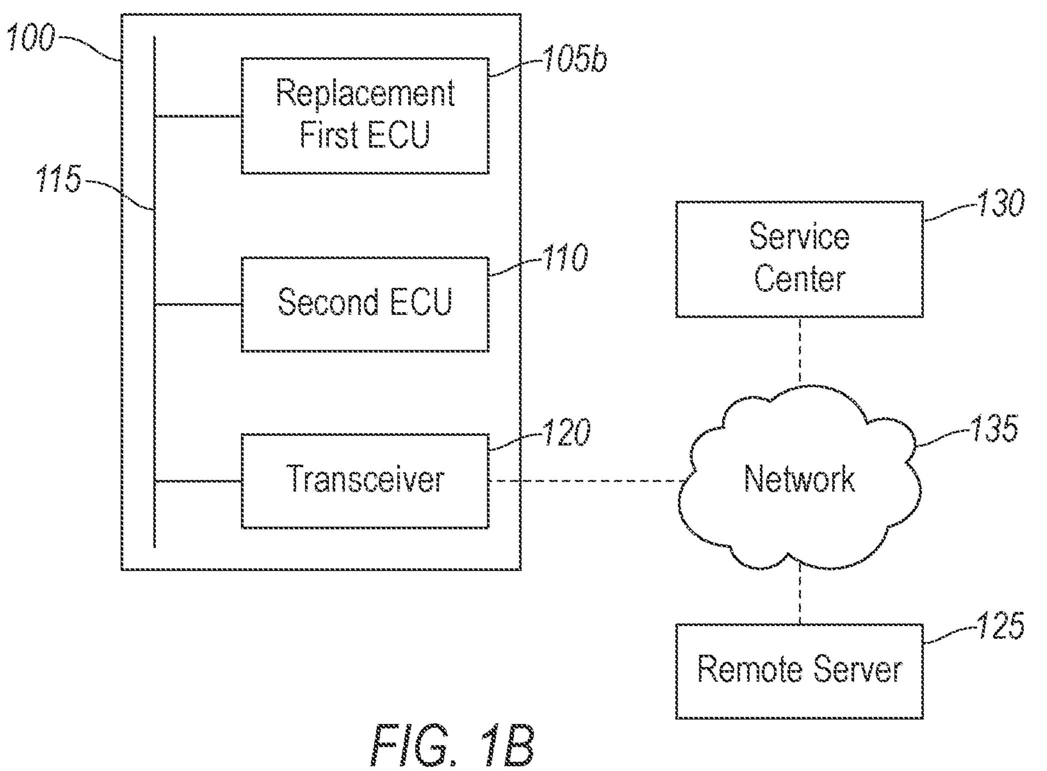
FIG. 1B is a block diagram of the system after the replacement of the ECU.

With reference to FIGS. 1A-B, the vehicle 100 may be any passenger or commercial automobile such as a car, a truck, a sport utility vehicle, a crossover, a van, a minivan, a taxi, a bus, etc.

The first ECU 105 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The first ECU 105 can thus include a processor, a memory, etc. The memory of the first ECU 105 can include media for storing instructions executable by the processor as well as for electronically storing data and/or databases, and/or the first ECU 105 can include structures such as the foregoing by which programming is provided.

This disclosure pertains to techniques for replacing the first ECU 105 on board the vehicle 100. The first ECU 105 on board the vehicle 100 before replacement will be referred to as the original first ECU 105*a*, and the first ECU 105 on board the vehicle 100 after replacement will be referred to as the replacement first ECU 105*b*. FIG. 1A shows the vehicle 100 before replacement, with the original first ECU 105*a* installed on board the vehicle 100. FIG. 1B shows the vehicle 100 after replacement, with the replacement first ECU 105*b* installed on board the vehicle 100. The original first ECU 105*a* and the replacement first ECU 105*b* may both include some or all of the programming described herein.

When installed on board the vehicle 100, the first ECU 105 may transmit and receive data through a vehicle network 115 such as a controller area network (CAN) bus, Ethernet, WiFi, Local Interconnect Network (LIN), onboard diagnostics connector (OBD-II), and/or by any other wired or wireless communications network. The first ECU 105 may be communicatively coupled to the second ECU 110, a transceiver 120, and other components via the vehicle network 115.

The second ECU 110 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The second ECU 110 can thus include a processor, a memory, etc. The memory of the second ECU 110 can include media for storing instructions executable by the processor as well as for electronically storing data and/or databases, and/or the second ECU 110 can include structures such as the foregoing by which programming is provided. The second ECU 110 may be a gateway module of the vehicle 100. The gateway module is an ECU that connects and transmits data between buses of different domains of the vehicle network 115, e.g., the CAN bus, Ethernet, LIN, OBD-II, etc., which can have different baud rates.

The transceiver 120 may be adapted to transmit signals wirelessly through any suitable wireless communication protocol, such as cellular, Bluetooth®, Bluetooth® Low Energy (BLE), ultra-wideband (UWB), WiFi, IEEE 802.11a/b/g/p, cellular-V2X (CV2X), Dedicated Short-Range Communications (DSRC), other RF (radio frequency) communications, etc. The transceiver 120 may be adapted to communicate with the remote server 125 and/or other servers remote from the vehicle 100. For example, a server may be associated with another vehicle (e.g., V2V communications), an infrastructure component (e.g., V2I communications), an emergency responder, a mobile device associated with the owner of the vehicle 100, etc. The transceiver 120 may be one device or may include a separate transmitter and receiver.

The replacement of the first ECU 105 may take place at a service center 130. The service center 130 may be a facility such as a repair shop or dealership. The service center 130 may communicate with the replacement first ECU **105*b* before installation or the original first ECU 105*a* after replacement by plugging equipment directly into the first ECU 105. The service center 130 may communicate with components on board the vehicle 100 via the transceiver 120 or by plugging equipment directly into the vehicle network 115**, e.g., via an OBD-II port.

The transceiver 120 and/or the service center 130 may be connected to the remote server 125 via a network 135. The network 135 represents one or more mechanisms by which the transceiver 120 or other components may communicate with the remote server 125. Accordingly, the network 135 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The remote server 125 is remote from the vehicle 100, that is, distinct and spaced from the vehicle 100. The remote server 125 is located outside the vehicle 100. The remote server 125 is also remote from the replacement first ECU **105*b* before the replacement first ECU 105*b* is installed on the vehicle 100, as well as remote from the service center 130. The remote server 125 may be associated with, e.g., a manufacturer of the vehicle 100**.

Figure 2A:
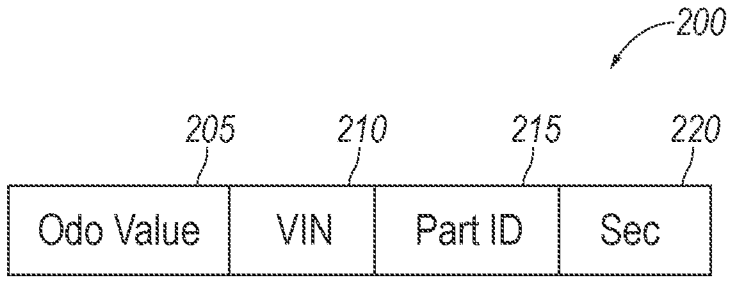
FIG. 2A is a diagram of an example third data block containing an odometer value.

With reference to FIG. 2A, the third data block 200 is a data block outputted by the first ECU 105. The third data block 200 may include the stored odometer value 205, a third vehicle identification number (VIN) 210, a third part number 215, and a third security feature 220.

The memory of the first ECU 105 stores the stored odometer value 205. The first ECU 105 may be programmed to generate the stored odometer value 205 by incrementing the stored odometer value 205 with distance traveled by the vehicle 100 (starting at zero, e.g., when the vehicle 100 has just been assembled or if the first ECU 105 is new). In other words, the first ECU 105 may operate as an odometer of the vehicle 100. As the first ECU 105 receives data over the vehicle network 115 indicating that the vehicle 100 is traveling, the first ECU 105 may increase the stored odometer value 205 accordingly. For example, the first ECU 105 may receive data indicating a number of revolutions of the wheels of the vehicle 100 and multiply the number of revolutions by a circumference of the tires of the vehicle 100, e.g., $\Delta d=\pi DN$, in which $\Delta d$ is a change in the stored odometer value 205, D is a diameter of the tires, and N is a number of revolutions of the tires, e.g., an average of the numbers of revolutions of each of the tires.

A VIN is a number encoding specific information about a specific vehicle, e.g., make and model, manufacturer, year of manufacture, plant of manufacture, etc. The VIN is unique to one vehicle and thus identifies the vehicle 100. For example, under National Highway Traffic Safety Administration (NHTSA) regulations, the VIN is seventeen characters long and is formed of letters and numbers. The third VIN 210 may be stored in the memory of the first ECU 105.

A part number is a number uniquely identifying a component of the vehicle 100. The part number may be unique to the component among components of the same type. For example, the third part number 215 may identify the first ECU 105. The third part number 215 may be unique among ECUs of a same model as the first ECU 105. The third part number 215 may be stored in the memory of the first ECU 105.

The first ECU 105 may be programmed to calculate the third security feature 220. The third security feature 220 may be, e.g., a hash value (as shown in the Figures), a digital signature, a cipher-based message authentication code (CMAC), etc. A hash value is a numeric value of fixed length that uniquely identifies data. The first ECU 105 may calculate the hash value by applying a hashing function to one or more other parts of the third data block 200, e.g., the stored odometer value 205, the third VIN 210, and/or the third part number 215. A hash function maps data of arbitrary size to a hash value of fixed size. The hash function may be any suitably secure hash function, e.g., SHA-256. A digital signature verifies a sender of a message and is determined from a private key and one or more other parts of the third data block 200. The digital signature may be verified using a public key. A CMAC is a message authentication code constructed from a block cipher. The CMAC may be determined from a secret key and one or more other parts of the third data block 200. The CMAC may be verified with the secret key. The third security feature 220 is then applied to the third data block 200, e.g., appended to the third data block 200, before the third data block 200 is transmitted to another entity.

The first ECU 105 may be programmed to transmit the third data block 200 to the second ECU 110, e.g., over the vehicle network 115 while the first ECU 105 is installed on board the vehicle 100. For example, the first ECU 105 may periodically transmit the third data block 200 to the second ECU 110, i.e., transmit the third data block 200 repeatedly at regular periods. The periods may be measured in distance traveled by the vehicle 100 or in time, i.e., the period may be a preset distance or preset time. For example, the first ECU 105 may transmit the third data block 200 to the second ECU 110 upon the vehicle 100 traveling the preset distance since a previous transmission of the third data block 200 to the second ECU 110. The preset distance may be, e.g., ten miles. The first ECU 105 may track progress to the preset distance using the stored odometer value 205.

The first ECU 105 may encrypt the third data block 200 before transmitting the third data block 200 to the second ECU 110, e.g., using any suitable encryption algorithm. The second ECU 110, as well as the other ECUs on board the vehicle 100, may lack the decryption key. The third data block 200 may therefore be inaccessible to someone without the decryption key despite the third data block 200 residing on the second ECU 110. The decryption key may be stored on the remote server 125.

Figure 2B:
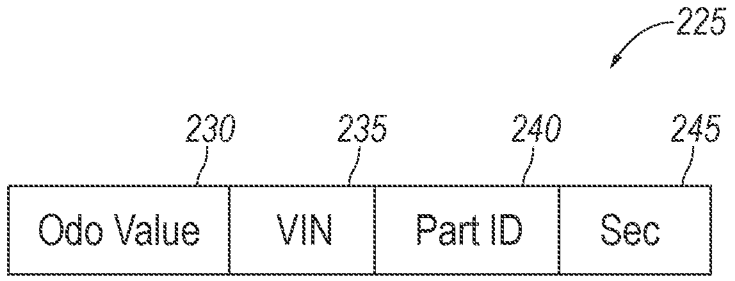
FIG. 2B is a diagram of an example second data block containing an odometer value.

With reference to FIG. 2B, the second data block 225 is a data block outputted by the second ECU 110. The second data block 225 may be the most recent third data block 200 received by the second ECU 110. The second ECU 110 may be programmed to transmit the second data block 225 to an entity upon receiving a request for the second data block 225 from the entity. The second data block 225 may include the second odometer value 230, a second VIN 235, a second part number 240, and a second security feature 245. If the most recent third data block 200 received by the second ECU 110 came from the original first ECU 105*a* and the replacement first ECU 105*b* has been installed, then the second part number 240 will be different from the third part number 215 of the third data block 200 outputted by the replacement first ECU 105*b*.

Figure 2C:
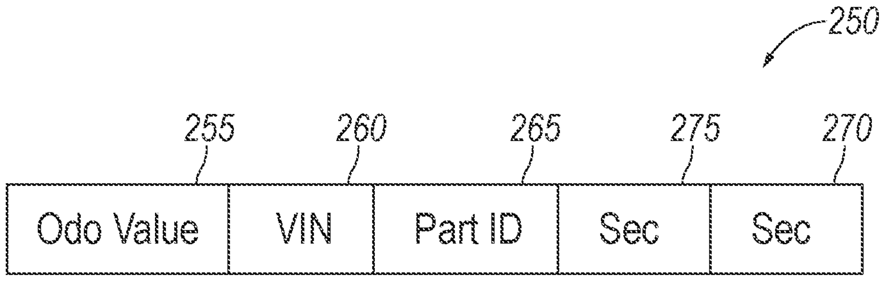
FIG. 2C is a diagram of an example first data block containing an odometer value.

With reference to FIG. 2C, the first data block 250 is a data block outputted by the remote server 125. The first data block 250 includes the first odometer value 255, a first VIN 260, a first part number 265, a third-block security feature 275, and a first security feature 270. The remote server 125 may be programmed to receive the third data block 200 or second data block 225, decrypt the third data block 200 or second data block 225, and generate the first data block 250 from the decrypted third data block 200 or second data block 225. For example, the service center 130 may download the third data block 200 or second data block 225, and the remote server 125 may receive the third data block 200 or second data block 225 from the service center 130 over the network 135. The service center 130 may send the third data block 200 if the original first ECU 105*a* is operational and the second data block 225 if the original first ECU 105*a* is not operational. The remote server 125 decrypts the third data block 200 or second data block 225 using the decryption key stored at the remote server 125. The remote server 125 may use the stored odometer value 205 or the second odometer value 230 as the first odometer value 255, the second VIN 235 or third VIN 210 as the first VIN 260, the second part number 240 or third part number 215 as the first part number 265, and the second security feature 245 or third security feature 220 as the third-block security feature 275. The service center 130 may transmit the VIN of the vehicle 100 to use as the first VIN 260. The remote server 125 may be programmed to calculate the first security feature 270, e.g., by applying the same algorithm as used by the first ECU 105 to determine the third security feature 220 to one or more parts of the first data block 250, e.g., the equivalent parts as the first ECU 105 when calculating the third security feature 220, e.g., the first odometer value 255, the first VIN 260, and/or the first part number 265, as well as possibly the third-block security feature 275.

The first ECU 105 upon installation, i.e., the replacement first ECU 105*b*, may be programmed to compare the first data block 250 received from the remote server 125 and the second data block 225 received from the second ECU 110. The first ECU 105 identifies either a match or a mismatch between equivalent portions of the first data block 250 and the second data block 225. A match means that the portions are equal or identical, and a mismatch means that the portions are unequal or different. For example, the match may be an equality between the first security feature 270 or third-block security feature 275 and the second security feature 245. The first ECU 105 may also validate the security features 245, 270, 275 upon receiving the respective data blocks 225, 250, before comparing the data blocks 225, 250. For another example, the match may be an equality between the first odometer value 255 and the second odometer value 230, and the mismatch may be an inequality between the first odometer value 255 and the second odometer value 230. For another example, the match may be an equality between the first VIN 260 and the second VIN 235, and the mismatch may be an inequality between the first VIN 260 and the second VIN 235. The first ECU 105 may also compare the first VIN 260 and the second VIN 235 to a VIN received over the vehicle network 115.

The first ECU 105 may be programmed to, upon identifying the mismatch between the first data block 250 and the second data block 225, output a request for a fourth data block. The fourth data block may be previously downloaded from the vehicle 100. For example, the fourth data may be the copy of the third data block 200 or second data block 225 downloaded at the service center 130, and which was sent to the remote server 125. The service center 130 may transmit the fourth data block to the first ECU 105 upon receiving the request for the fourth data block. The fourth data block may include a fourth odometer value, a fourth VIN, a fourth part number, and a fourth security feature, as described above for the equivalent portions of the second data block 225 and third data block 200.

The first ECU 105 may be programmed to compare the first data block 250 and the fourth data block. The first ECU 105 identifies either a match or a mismatch between equivalent portions of the first data block 250 and the fourth data block (referred to hereinafter as a second match and a second mismatch to differentiate from the comparison between the first data block 250 and second data block 225 described above). For example, the second match may be an equality between the first security feature 270 or third-block security feature 275 and the fourth security feature, and the second mismatch may be an inequality between the first security feature 270 or third-block security feature 275 and the fourth security feature. The first ECU 105 may also validate the security features 270, 275 from the first data block 250 upon receiving the first data block 250 and the fourth security feature upon receiving the fourth data block, before comparing the first data block 225 and the fourth data block.

The first ECU 105 may be programmed to replace the stored odometer value 205 on the first ECU 105 with the first odometer value 255 upon either identifying the match between the first data block 250 and the second data block 225 or identifying the second match between the first data block 250 and the fourth data block. The first ECU 105 may be programmed to replace the stored odometer value 205 with the first odometer value 255 even if the first odometer value 255 is less than the stored odometer value 205.

The first ECU 105 may be programmed to maintain the stored odometer value 205 on the first ECU 105 upon identifying the mismatch and either identifying the second mismatch or failing to receive the fourth data block. The first ECU 105 may thus prevent an unauthorized decrease of the stored odometer value 205.

The first ECU 105 may be programmed to, upon the same conditions as maintaining the stored odometer value 205, instruct a component of the vehicle 100 to disable an operation of the component. In other words, the first ECU 105 instructs the component to disable the operation of the component upon identifying the mismatch and either identifying the second mismatch or failing to receive the fourth data block. For example, the component may be an infotainment center, and the operation may be, e.g., navigation and/or media input. Thus, the first ECU 105 may instruct the infotainment center to disable navigation or audio entertainment functionality. The infotainment center may be chosen to make operating the vehicle 100 less desirable while not impairing the operation of the vehicle 100.

Figure 3A:
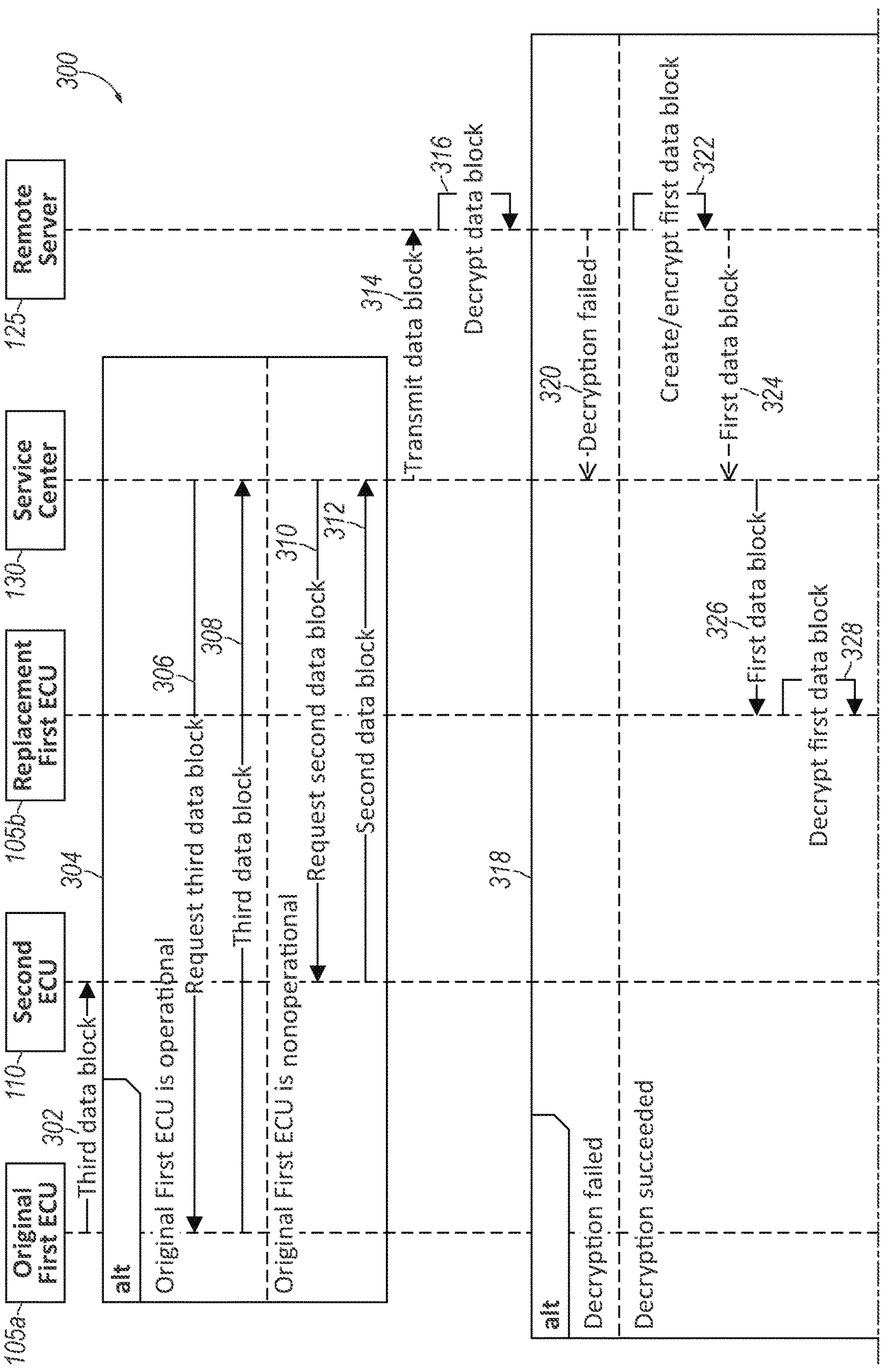
FIGS. 3A-C are collectively a sequence diagram of an example sequence for replacing the ECU.
Figure 3B:
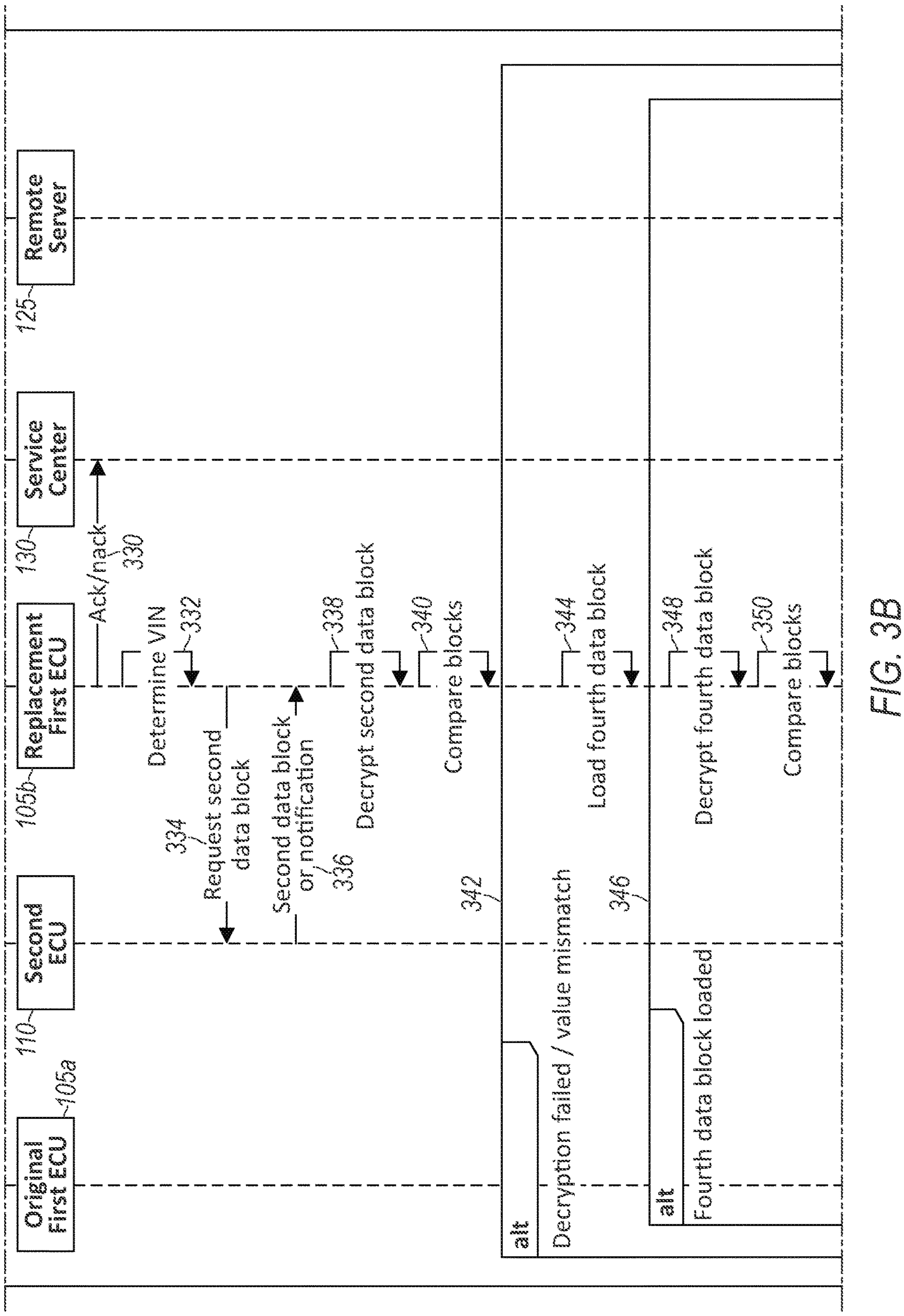
Figure 3C:
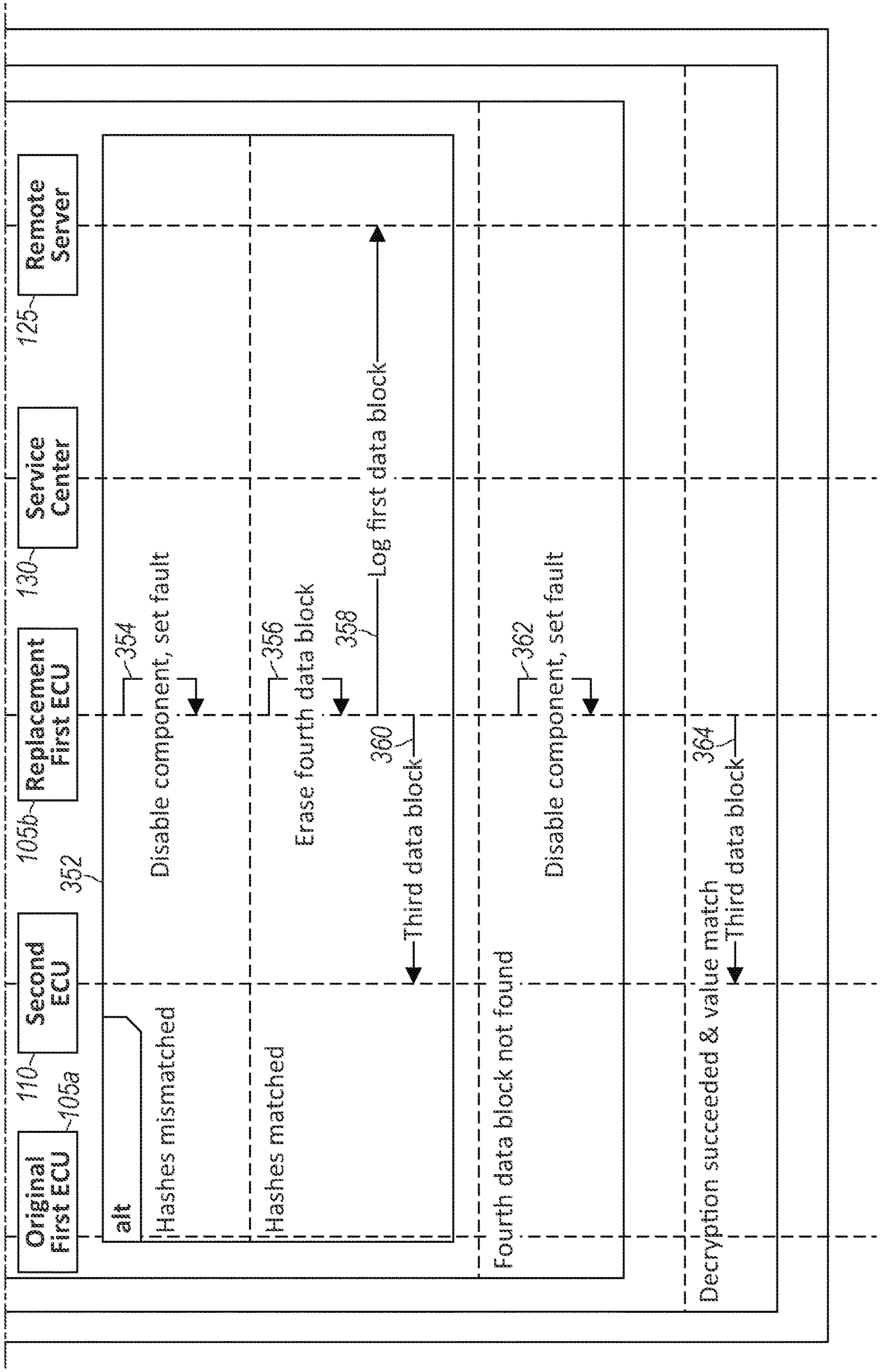

FIGS. 3A-C are collectively a sequence diagram illustrating an example sequence 300 of steps for replacing the first ECU 105. The sequence 300 may be performed by the original first ECU 105*a*, the replacement first ECU 105*b*, the second ECU 110, the service center 130, and the remote server 125. The memories of the original first ECU 105*a*, the replacement first ECU 105*b*, the second ECU 110, the service center 130, and the remote server 125 may store executable instructions for performing the respective steps of the sequence 300 and/or programming can be implemented in structures such as mentioned above. The steps at the service center 130 may be performed manually by a technician at the service center 130.

In a step 302, before the replacement and during regular operation of the vehicle 100, the original first ECU 105*a* encrypts and transmits the third data block 200 to the second ECU 110, as described above.

Next, the vehicle 100 may be brought in to the service center 130 for replacement of the original first ECU 105*a* with the replacement first ECU 105*b*. An alternative box 304 includes a first alternative, that the original first ECU 105*a* is still operational, and a second alternative, that the original first ECU 105*a* is no longer operational. In the first alternative, steps 306-308 are performed. In the second alternative, steps 310-312 are performed.

In the step 306, the service center 130 requests the third data block 200 from the original first ECU 105*a*. The original first ECU 105*a* may still be on board the vehicle 100 or may be removed from the vehicle 100 and attached to equipment of the service center 130. Next, in the step 308, the original first ECU 105*a* encrypts and transmits the third data block 200 to the service center 130.

In the step 310, the service center 130 requests the second data block 225 from the second ECU 110. Next, in the step 312, the second ECU 110 transmits the second data block 225 to the service center 130.

After the alternative box 304, in a step 314, the service center 130 transmits either the second data block 225 or the third data block 200 to the remote server 125. The service center 130 may include the VIN of the vehicle 100 in the transmission.

Next, in a step 316, the remote server 125 decrypts the third data block 200 or second data block 225, as described above.

Next, an alternative box 318 include a first alternative, that the decryption failed, and a second alternative, that the decryption succeeded. In the first alternative, a step 320 is performed.

In the second alternative, steps 322-364 are performed, i.e., the rest of the sequence 300.

In the step 320, the remote server 125 transmits a message to the service center 130 indicating that the decryption failed. The sequence 300 ends.

In the step 322, the remote server 125 generates and encrypts the first data block 250, as described above. Next, in a step 324, the remote server 125 transmits the first data block 250 to the service center 130.

Next, in a step 326, the service center 130 transmits the first data block 250 to the replacement first ECU 105*b*. The first data block 250 may remain encrypted. The replacement first ECU 105*b* may or may not yet be installed into the vehicle 100.

Next, in a step 328, the replacement first ECU 105*b* decrypts the first data block 250.

Next, in a step 330, the replacement first ECU 105*b* transmits an acknowledgement indicating that the decryption was successful or a negative acknowledgement indicating that the decryption was unsuccessful.

Next, in a step 332, the replacement first ECU 105*b* determines the VIN from the vehicle network 115. Transmissions over the vehicle network 115 from other ECUs may include the VIN. From this point through the rest of the sequence 300, the replacement first ECU 105*b* is installed on board the vehicle 100.

Next, in a step 334, the replacement first ECU 105*b* requests the second data block 225 from the second ECU 110 over the vehicle network 115. Next, in a step 336, the second ECU 110 transmits the second data block 225 to the replacement first ECU 105*b* over the vehicle network 115, and the replacement first ECU 105*b* receives the second data block 225.

Next, in a step 338, the replacement first ECU 105*b* decrypts the second data block 225.

Next, in a step 340, the replacement first ECU 105*b* compares the first data block 250 and the second data block 225, as described above.

Next, an alternative box 342 includes a first alternative and a second alternative. The first alternative occurs upon the decryption failing in the step 338 or upon the replacement first ECU 105*b* identifying a mismatch between the first data block 250 and the second data block 225 in the step 340, as described above. The first alternative may also occur upon the first VIN 260 or the second VIN 235 not matching the VIN received in the step 332 above. The second alternative occurs upon the decryption being successful and the replacement first ECU 105*b* identifying a match between the first data block 250 and the second data block 225. In the first alternative, steps 344-362 are performed. In the second alternative, a step 364 is performed.

In the step 344, the replacement first ECU 105*b* outputs a request for a fourth data block to the service center 130, as described above. The fourth data block was previously downloaded from the vehicle 100 in the step 308 or the step 312 above.

Next, an alternative box 346 includes a first alternative, that the replacement first ECU 105*b* received the fourth data block from the service center 130, and a second alternative, that the replacement first ECU 105*b* failed to receive the fourth data block from the service center 130. In the first alternative, steps 348-360 are performed. In the second alternative, a step 362 is performed.

In the step 348, the replacement first ECU 105*b* decrypts the fourth data block, as described above. Next, in a step 350, the replacement first ECU 105*b* compares the first data block 250 and the fourth data block, e.g., the first security feature 270 and the fourth security feature, as described above.

Next, an alternative box 352 includes a first alternative, that the replacement first ECU 105*b* identified a second mismatch between the first data block 250 and the fourth data block, and a second alternative, that the replacement first ECU 105*b* identified a second match between the first data block 250 and the fourth data block. In the first alternative, a step 354 is performed. In the second alternative, steps 356-360 are performed.

In the step 354, the replacement first ECU 105*b* maintains the stored odometer value 205 on the replacement first ECU 105*b* and instructs a component of the vehicle 100 to disable an operation of the component, as described above. The replacement first ECU 105*b* may also log the third data block 200 with the unchanged stored odometer value 205 with the remote server 125 by encrypting and transmitting the third data block 200 to the remote server 125. After the step 354, the sequence 300 ends.

In the step 356, the replacement first ECU 105*b* replaces the stored odometer value 205 on the replacement first ECU 105*b* with the first odometer value 255, as described above. Next, in a step 358, the replacement first ECU 105*b* logs the first data block 250 with the remote server 125 by encrypting and transmitting the third data block 200, generated after the first odometer value 255 replaced the stored odometer value 205, to the remote server 125. Next, in a step 360, the replacement first ECU 105*b* encrypts and transmits the third data block 200 to the second ECU 110, as described above.

This is the first transmission as part of the periodic transmission of the third data block 200 to the second ECU 110. After the step 360, the sequence 300 ends.

In the step 362, the replacement first ECU 105*b* maintains the stored odometer value 205 on the replacement first ECU 105*b* and instructs a component of the vehicle 100 to disable an operation of the component, as described above. The replacement first ECU 105*b* may also log the third data block 200 with the unchanged stored odometer value 205 with the remote server 125 by encrypting and transmitting the third data block 200 to the remote server 125. After the step 362, the sequence 300 ends.

In the step 364, the replacement first ECU 105*b* encrypts and transmits the third data block 200 to the second ECU 110, as described above. This is the first transmission as part of the periodic transmission of the third data block 200 to the second ECU 110. After the step 364, the sequence 300 ends.

Figure 4:
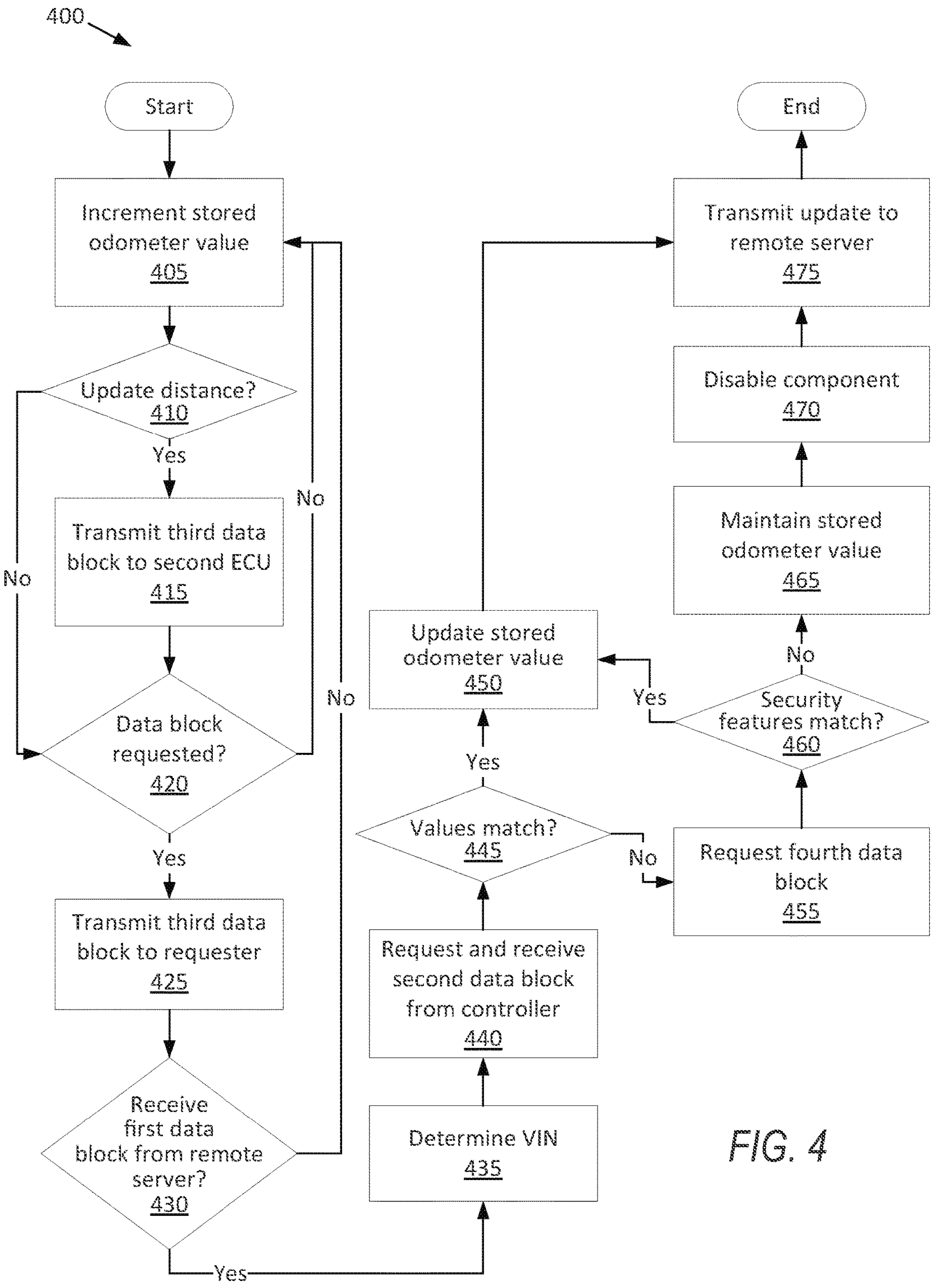
FIG. 4 is a flowchart of an example process for the ECU to replace the ECU.

FIG. 4 is a process flow diagram illustrating an example process 400 for the first ECU 105 to facilitate replacement of the first ECU 105. The memory of the first ECU 105 stores executable instructions for performing the steps of the process 400 and/or programming can be implemented in structures such as mentioned above. As a general overview of the process 400, the first ECU 105 increments the stored odometer value 205 and periodically transmits the third data block 200 to the second ECU 110. Upon receiving a request for the third data block 200 from the service center 130, the first ECU 105 transmits the third data block 200 to the service center 130.

Next, upon receiving the first data block 250 from the remote server 125, the first ECU 105 determines the VIN, requests and receives the second data block 225 from the second ECU 110, requests the fourth data block from the service center 130 upon identifying a mismatch between the first data block 250 and the second data block 225, and replaces the stored odometer value 205 with the first odometer value 255 upon identifying a match between the first data block 250 and the second data block 225 or upon identifying a second match between the first data block 250 and the fourth data block. Upon identifying a second mismatch between the first data block 250 and the fourth data block, the first ECU 105 maintains the stored odometer value 205 and instructs a component to disable an operation of the component. Finally, the first ECU 105 transmits an update indicating whether the first odometer value 255 replaced the stored odometer value 205.

The process 400 begins in a block 405, in which the first ECU 105 increments the stored odometer value 205 with distance traveled by the vehicle 100, as described above.

Next, in a decision block 410, the first ECU 105 determines whether the period has elapsed since a previous transmission of the third data block 200 to the second ECU 110, e.g., whether the vehicle 100 has traveled the preset distance since the previous transmission. Upon the period elapsing, the process 400 proceeds to a block 415. Otherwise, the process 400 proceeds to a decision block 420.

In the block 415, the first ECU 105 encrypts and transmits the third data block 200 to the second ECU 110, as described above. After the block 415, the process 400 proceeds to the decision block 420.

In the decision block 420, the first ECU 105 determines whether the service center 130 requested the third data block 200. If so, the process 400 proceeds to a block 425. If not, the process 400 returns to the block 405 to continue incrementing the stored odometer value 205.

In the block 425, the first ECU 105 encrypts and transmits the third data block 200 to the service center 130, as described above.

Next, in a decision block 430, the first ECU 105 determines whether the first ECU 105 received the first data block 250 from the remote server 125. Upon receiving the first data block 250 from the remote server 125, the process 400 proceeds to a block 435. Otherwise, the process 400 returns to the block 405 to continue incrementing the stored odometer value 205.

In the block 435, the first ECU 105 determines the VIN from the vehicle network 115, as described above.

Next, in a block 440, the first ECU 105 requests and receives the second data block 225 from the second ECU 110 while the first ECU 105 is installed on board the vehicle 100, e.g., over the vehicle network 115, as described above.

Next, in a decision block 445, the first ECU 105 compares the first data block 250 and the second data block 225, as described above. Upon identifying a match between the first data block 250 and the second data block 225, the process 400 proceeds to a block 450. Upon identifying a mismatch between the first data block 250 and the second data block 225 or upon the first VIN 260 or the second VIN 235 not matching the VIN determined in the block 435, the process 400 proceeds to a block 455.

In the block 450, the first ECU 105 replaces the stored odometer value 205 on the first ECU 105 with the first odometer value 255, as described above. After the block 450, the process 400 proceeds to a block 475.

In the block 455, the first ECU 105 outputs a request for the fourth data block to the service center 130, as described above. The fourth data block was previously downloaded from the vehicle 100, either as the third data block 200 in the block 425 or as the second data block 225 from the second ECU 110.

Next, in a decision block 460, the first ECU 105 compares the first data block 250 and the fourth data block, as described above. Upon identifying a second match between the first data block 250 and the fourth data block, the process 400 proceeds to the block 450. Upon identifying a second mismatch between the first data block 250 and the fourth data block or upon failing to receive the fourth data block, the process 400 proceeds to a block 465.

In the block 465, the first ECU 105 maintains the stored odometer value 205 on the first ECU 105, as described above.

Next, in a block 470, the first ECU 105 instructs a component of the vehicle 100 to disable an operation of the component, as described above. After the block 470, the process 400 proceeds to the block 475.

In the block 475, the first ECU 105 logs the third data block 200 with the remote server 125, either with the stored odometer value 205 replaced by the first odometer or not, as described above. After the block 475, the process 400 ends.

Figure 5:
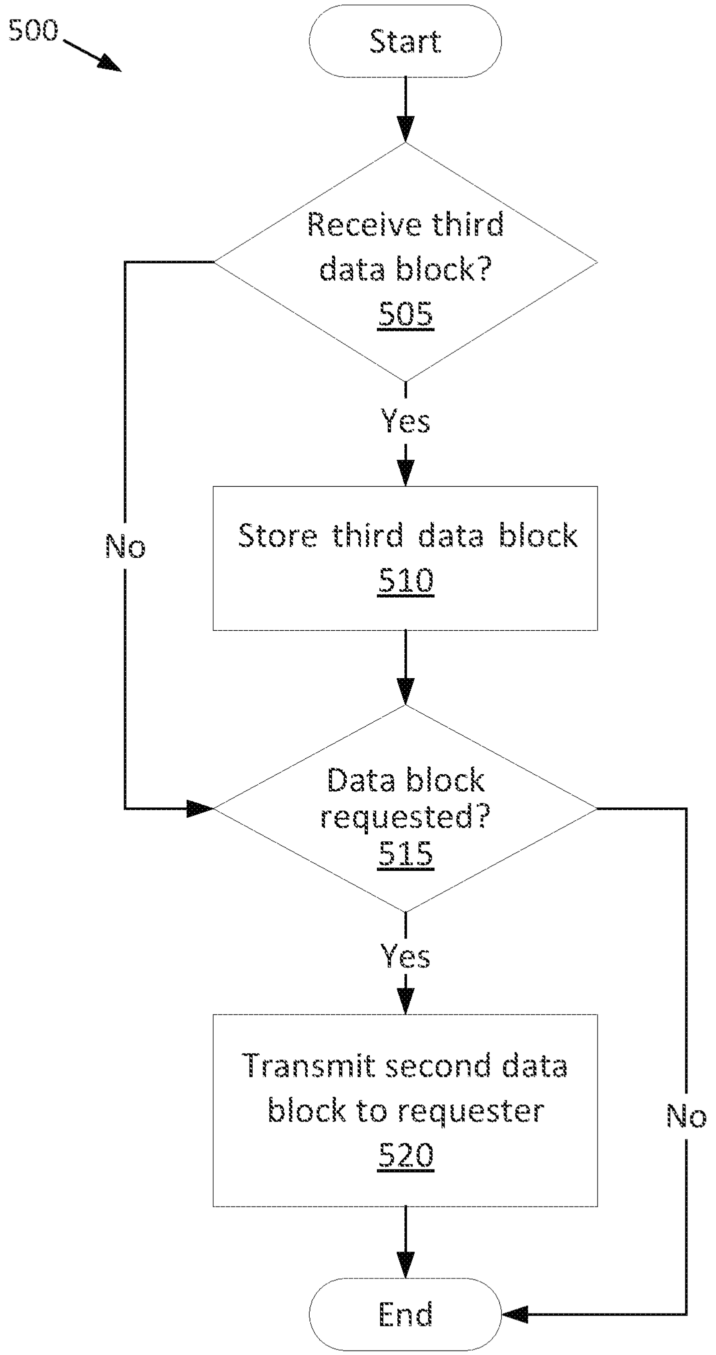
FIG. 5 is a flowchart of an example process for a second ECU to replace the ECU.

FIG. 5 is a process flow diagram illustrating an example process 500 for the second ECU 110 to replace the first ECU 105. The memory of the second ECU 110 stores executable instructions for performing the steps of the process 500 and/or programming can be implemented in structures such as mentioned above. As a general overview of the process 500, upon receiving the third data block 200, the second ECU 110 stores the third data block 200, which is thereby referred to as the second data block 225. Upon receiving a request for the second data block 225, the second ECU 110 transmits the second data block 225 to the requester.

The process 500 begins in a decision block 505, in which the second ECU 110 determines whether the second ECU 110 has received the third data block 200 from the first ECU 105. Upon receiving the third data block 200, the process 500 proceeds to a block 510. If the second ECU 110 has not received a new third data block 200, the process 500 proceeds to a decision block 515.

In the block 510, the second ECU 110 stores the third data block 200, which is now referred to as the second data block 225. The second data block 225 is already encrypted. The second ECU 110 does not decrypt the second data block 225 and may not be capable of decrypting the second data block 225, i.e., may lack the decryption key. After the block 510, the process 500 proceeds to the decision block 515.

In the decision block 515, the second ECU 110 determines whether a request has been received for the second data block 225. The request may originate from the first ECU 105, as described above with respect to the block 440 of the process 400 and the steps 334-336 of the sequence 300. Alternatively, the request may originate from the service center 130, as described above with respect to the steps 310-312 of the sequence 300. Upon receiving the request for the second data block 225, the process 500 proceeds to a block 520. If no request has been received, the process 500 ends.

In the block 520, the second ECU 110 transmits the second data block 225 to the requester, either the first ECU 105 or the service center 130. After the block 520, the process 500 ends.

Figure 6:
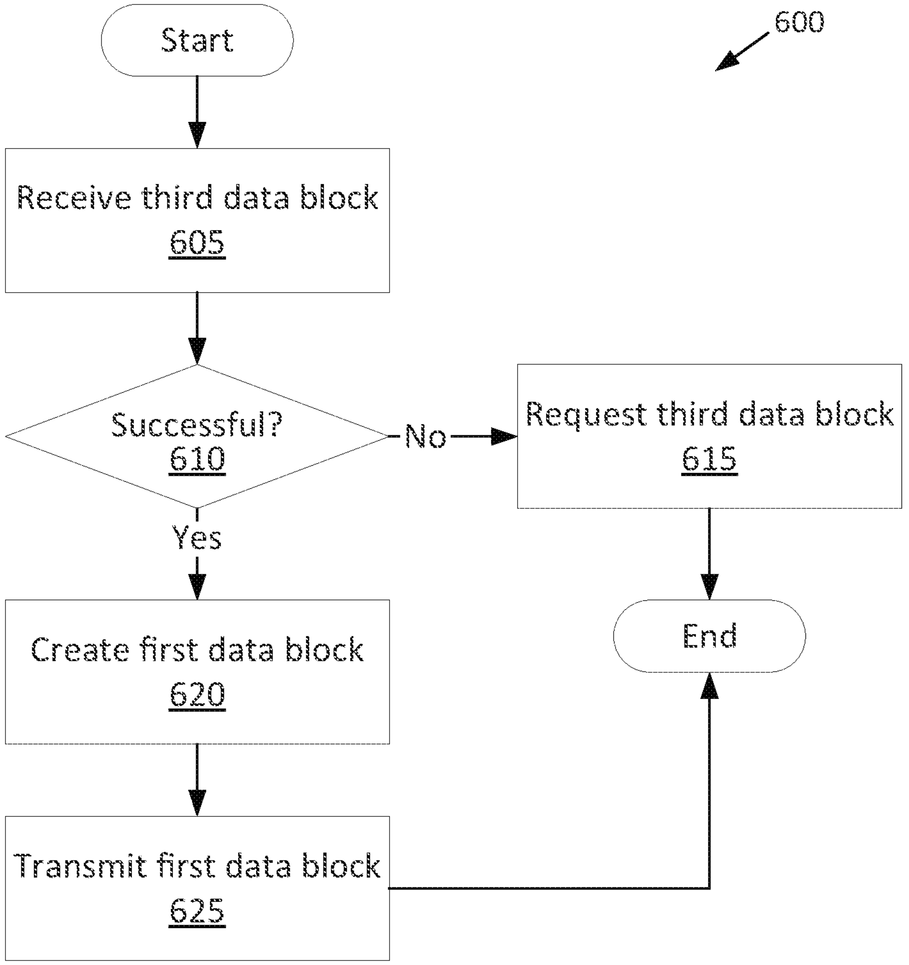
FIG. 6 is a flowchart of an example process for a remote server to replace the ECU.

FIG. 6 is a process flow diagram illustrating an example process 600 for the remote server 125 to replace the first ECU 105 in the vehicle 100. The memory of the remote server 125 stores executable instructions for performing the steps of the process 600 and/or programming can be implemented in structures such as mentioned above. As a general overview of the process 600, the remote server 125 receives the second data block 225 or the third data block 200 from the service center 130. Upon successfully decrypting the third data block 200 or second data block 225, the remote server 125 generates the first data block 250 and transmits the first data block 250 to the first ECU 105. Upon unsuccessfully attempting to decrypt the third data block 200 or second data block 225, the remote server 125 requests that the service center 130 retransmit the third data block 200 or second data block 225.

The process 600 begins in a block 605, in which the remote server 125 receives the third data block 200 or second data block 225, as described above. The service center 130 transmits the third data block 200 if the original first ECU 105*a* is operational and transmits the second data block 225 if the original first ECU 105*a* is not operational.

Next, in a decision block 610, the remote server 125 decrypts the third data block 200 or second data block 225. Upon unsuccessfully attempting to decrypt the third data block 200 or second data block 225, the process 600 proceeds to a block 615. Upon successfully decrypting the third data block 200 or second data block 225, the process 600 proceeds to a block 620.

In the block 615, the remote server 125 transmits a request to the service center 130 to retransmit the third data block 200 or second data block 225. After the block 615, the process 600 ends.

In the block 620, the remote server 125 generates the first data block 250, as described above.

Next, in a block 625, the remote server 125 transmits the first data block 250 to the first ECU 105, as described above. After the block 625, the process 600 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first," "second," "third," and "fourth" are used throughout this document as identifiers and are not intended to signify importance, order, or quantity. Use of "in response to," "upon determining," "upon receiving," etc. indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory, the memory storing instructions executable by the processor to:

receive a first data block from a server remote from the computer and remote from a vehicle, the first data block including a first odometer value;

once the computer is installed as a replacement on board the vehicle, receive a second data block from an electronic control unit (ECU) on the vehicle, the second data block including a second odometer value;

compare the first data block and the second data block;

upon identifying a match between the first data block and the second data block, replace a stored odometer value on the computer with the first odometer value; and upon identifying a mismatch between the first data block and the second data block, maintain the stored odometer value on the computer.

2. The computer of claim 1, wherein the instructions further include instructions to increment the stored odometer value with distance traveled by the vehicle.

3. The computer of claim 1, wherein the instructions further include instructions to transmit a third data block to the ECU, the third data block including the stored odometer value.

4. The computer of claim 3, wherein the instructions further include instructions to periodically transmit the third data block to the ECU.

5. The computer of claim 3, wherein the instructions further include instructions to, upon the vehicle traveling a preset distance since a previous transmission of the third data block to the ECU, transmit the third data block to the ECU.

6. The computer of claim 3, wherein the instructions further include instructions to calculate a security feature and apply the security feature to the third data block before transmitting the third data block to the ECU.

7. The computer of claim 1, wherein the first odometer value is less than the stored odometer value.

8. The computer of claim 1, wherein the match is an equality between the first odometer value and the second odometer value, and the mismatch is an inequality between the first odometer value and the second odometer value.

9. The computer of claim 1, wherein the first data block includes a first vehicle identification number (VIN), the second data block includes a second VIN, the match is an equality between the first VIN and the second VIN, and the mismatch is an inequality between the first VIN and the second VIN.

10. The computer of claim 9, wherein the instructions further include instructions to, upon the first VIN not matching a third VIN of the vehicle, maintain the stored odometer value on the computer.

11. The computer of claim 10, wherein the instructions further include instructions to determine the third VIN from a vehicle network of the vehicle.

12. The computer of claim 9, wherein the instructions further include instructions to, upon the second VIN not matching a third VIN of the vehicle, maintain the stored odometer value on the computer.

13. The computer of claim 1, wherein the instructions further include instructions to, upon identifying the mismatch between the first data block and the second data block, instruct a component of the vehicle to disable an operation of the component.

14. The computer of claim 1, wherein the instructions further include instructions to, upon identifying the mismatch between the first data block and the second data block, output a request for a fourth data block, the fourth data block previously downloaded from the vehicle, the fourth data block including a fourth odometer value.

15. The computer of claim 14, wherein the instructions further include instructions to:

compare the first data block and the fourth data block;

upon identifying a second match between the first data block and the fourth data block, replace the stored odometer value on the computer with the first odometer value; and upon identifying a second mismatch between the first data block and the fourth data block, maintain the stored odometer value on the computer.

16. The computer of claim 15, wherein the first data block includes a first security feature, the fourth data block includes a fourth security feature, the second match is an equality between the first security feature and the fourth security feature, and the second mismatch is an inequality between the first security feature and the fourth security feature.

17. The computer of claim 16, wherein the first security feature is calculated from the first odometer value, and the fourth security feature is calculated from the fourth odometer value.

18. The computer of claim 14, wherein the instructions further include instructions to, upon failing to receive the fourth data block, maintain the stored odometer value on the computer.

19. The computer of claim 1, wherein the instructions further include instructions to decrypt the first data block, and decrypt the second data block.

20. A method comprising:

receiving a first data block from a server remote from a computer and remote from a vehicle, the first data block including a first odometer value;

receiving a second data block from an electronic control unit (ECU) on the vehicle by the computer, the second data block including a second odometer value, the computer receiving the second data block from the ECU once the computer is installed as a replacement on board the vehicle;

comparing the first data block and the second data block;

upon identifying a match between the first data block and the second data block, replacing a stored odometer value on the computer with the first odometer value; and upon identifying a mismatch between the first data block and the second data block, maintaining the stored odometer value on the computer.

* * * * *